United States Patent
Hahn et al.

(10) Patent No.: US 10,990,294 B2
(45) Date of Patent: Apr. 27, 2021

(54) NON-VOLATILE STORAGE SYSTEM WITH MULTI-READ MODE

(71) Applicant: Western Digital Technologies, Inc., San Jose, CA (US)

(72) Inventors: Judah Gamliel Hahn, Ofra (IL); Alon Marcu, Tel-Mond (IL); Ariel Navon, Revava (IL); Alex Bazarsky, Holon (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 129 days.

(21) Appl. No.: 15/936,050

(22) Filed: Mar. 26, 2018

(65) Prior Publication Data

US 2019/0294344 A1    Sep. 26, 2019

(51) Int. Cl.
*G06F 3/06* (2006.01)

(52) U.S. Cl.
CPC .......... *G06F 3/0614* (2013.01); *G06F 3/0604* (2013.01); *G06F 3/0653* (2013.01); *G06F 3/0679* (2013.01)

(58) Field of Classification Search
CPC .... G06F 3/0614; G06F 3/0679; G06F 3/0653; G06F 3/0604
See application file for complete search history.

(56) References Cited

U.S. PATENT DOCUMENTS

| | | | |
|---|---|---|---|
| 7,254,765 B2 | 8/2007 | Meyer | |
| 7,266,750 B1 | 9/2007 | Patapoutian | |
| 7,849,383 B2 * | 12/2010 | Lin | G06F 11/1072 365/220 |
| 8,301,979 B2 | 10/2012 | Sharon | |
| 8,479,077 B2 | 7/2013 | Lee | |
| 8,990,665 B1 * | 3/2015 | Steiner | G11C 11/5642 714/769 |
| 9,201,777 B2 | 12/2015 | Hsu | |
| 2008/0244338 A1 | 10/2008 | Mokhlesi | |
| 2008/0250300 A1 * | 10/2008 | Mokhlesi | G11C 16/28 714/780 |
| 2008/0276156 A1 | 11/2008 | Gunnam | |
| 2008/0301521 A1 | 12/2008 | Gunnam | |
| 2009/0106626 A1 | 4/2009 | Hou | |
| 2009/0172257 A1 * | 7/2009 | Prins | G06F 3/0659 711/103 |

(Continued)

OTHER PUBLICATIONS

NVM Express, Revision 1.2.1, Jun. 5, 2016, available at http://nvmexpress.org.

(Continued)

*Primary Examiner* — April Y Blair
*Assistant Examiner* — Rong Tang
(74) *Attorney, Agent, or Firm* — Vierra Magen Marcus LLP

(57) ABSTRACT

Technology is disclosed for reading non-volatile memory when a host does not need perfect data. By allowing the memory to return data with some errors, the data will be provided to the host much quicker. Therefore, in response to one or more host read commands, the memory system returns multiple copies of the data over time, progressively getting better so that later in time copies of the data have lower number of errors. The host decides when the error rate is good enough and stops the process (or ignores the rest of the results).

17 Claims, 14 Drawing Sheets

(56) References Cited

U.S. PATENT DOCUMENTS

| | | |
|---|---|---|
| 2015/0195374 A1 | 7/2015 | Wang |
| 2015/0261631 A1* | 9/2015 | Kurihara ............ G06F 11/0793 714/6.11 |
| 2016/0026406 A1 | 1/2016 | Hahn |
| 2016/0070486 A1 | 3/2016 | Anderson |
| 2016/0246726 A1 | 8/2016 | Hahn |
| 2017/0242606 A1 | 8/2017 | Vlaiko |
| 2017/0242820 A1 | 8/2017 | Pupanagunta |

OTHER PUBLICATIONS

Brewer, et al., "Disks for Data Centers, White paper for FAST 2016," Feb. 23, 2016 available at http://research.google.com/pubs/pub44830.html.

Strass, "An Introduction to NVMe," Seagate Technology LLC, 2016.

Native Command Queuing (NCQ) defined, Sandisk Global Customer Care, 2018 Western Digital Corporation, available at https://kb.sandisk.com/app/answers/detail/a_id/8146/~native-command.

NVM Express, Revision 1.3, May 1, 2017, available at http://nvmexpress.org.

NVM Express Introduction and History, NVM Express, Inc., Jul. 2017.

Huffman, "NVM Express: Optimized Interface for PCI Express* SSDs," Intel Corporation 2013.

PCIe SSD 101, An Overview of Standards, Markets and Performance, Storage Networking Industry Association, SNIA Solid State Storage Initiative, Aug. 2013.

"The Synopsys NVMe VIP: A High Level View," VIP Central, Sep. 17, 2015, available at https://blogs.synopsys.com/vip-central/2015/09/17/the-synopsys-nvme-vip-a-high-level-view/.

* cited by examiner

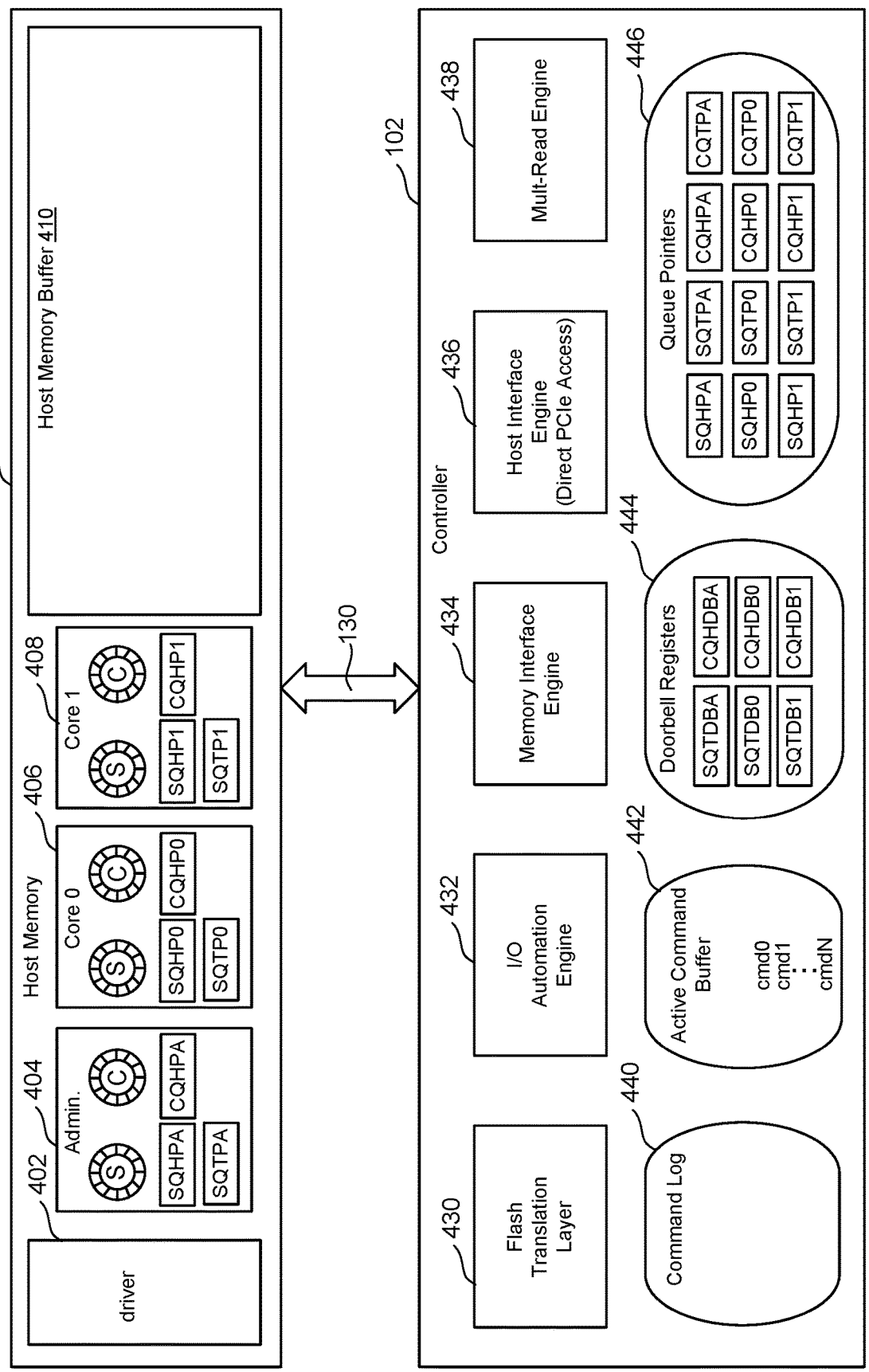

Figure 7

Submission Queue Entry

| Bytes | Description |
|---|---|
| 63:40 | Command Dwords 15-10 (CDW15-10): 6 double words of command specific information |
| 39:24 | Data Pointer (DPTR): This field specifies the data used in the command (e.g., PRP, SGL or other buffer) |
| 23:16 | Metadata Pointer (MPTR): This field contains the address of a buffer containing metadata (if any). |
| 15:08 | Reserved |
| 07:04 | Namesapce Identifier (NSID): This field specifies the namespace that this command applies to. |
| 03:00 | Command Dword 0: The command opcode and control bits |

Figure 8

Command Dword 0

| Bits | Description |
|---|---|
| 31:16 | Command Identifier (CID): This field specifies a unique identifier for the command when combined with the Submission Queue identifier |
| 15:14 | PRP or SGL for Data Transfer (PSDT): This field specifies whether PRPs or SGLs are used for any data transfer associated with the command. |
| 13:10 | Reserved |
| 09:08 | Fused Operation (FUSE): In a fused operation, a complex command is created by "fusing" together two simpler commands. |
| 07:00 | Opcode (OPC): The opcpde of the command opcode to be executed |

Figure 9

Completion Queue Entry

| Bytes | Description | | |
|---|---|---|---|
| 15:12 | Command Specific | | |
| 11:08 | Reserved | | |
| 07:04 | SQ Identifier | | SQ Head Pointer |
| 03:00 | Status Field | P | Command Identifier |

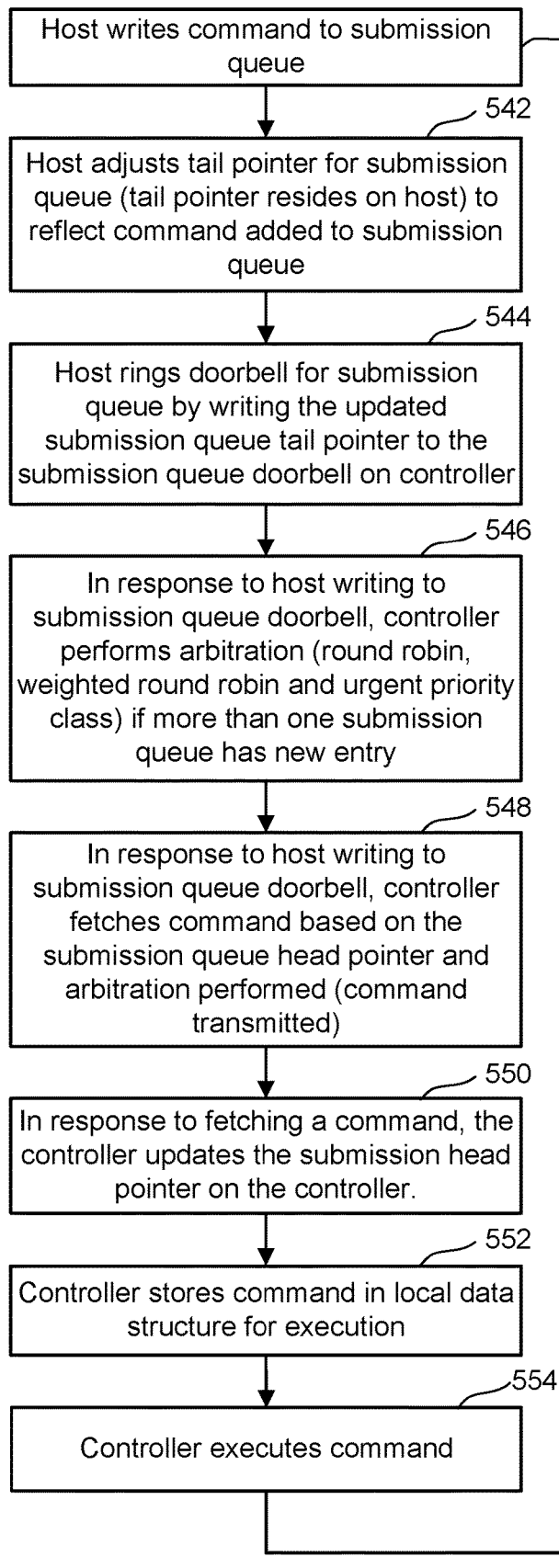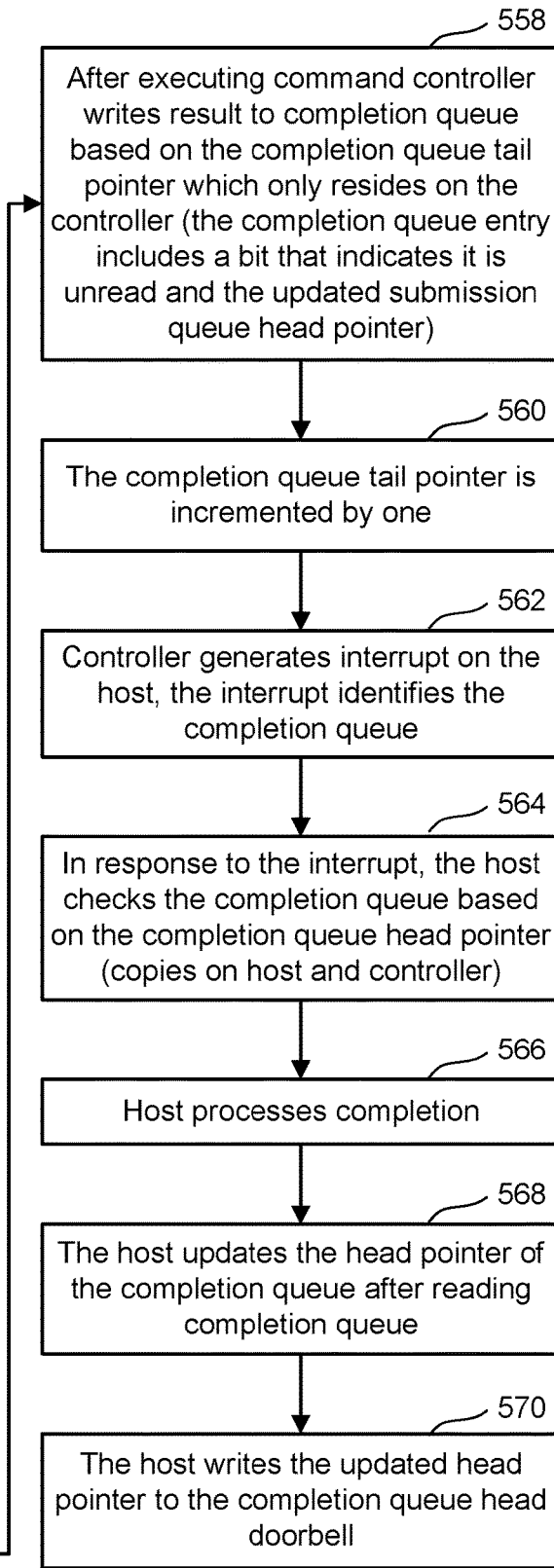
Figure 10

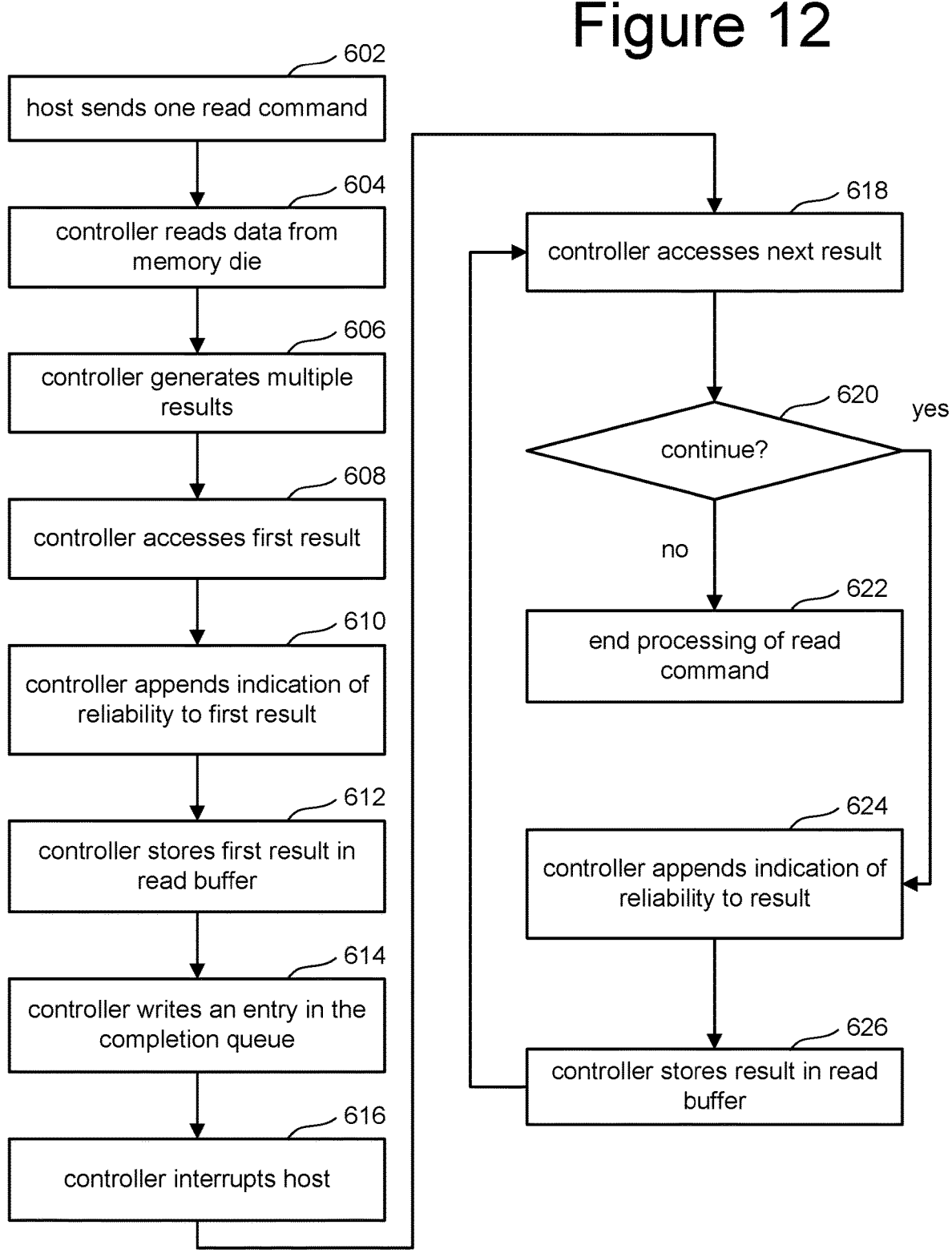

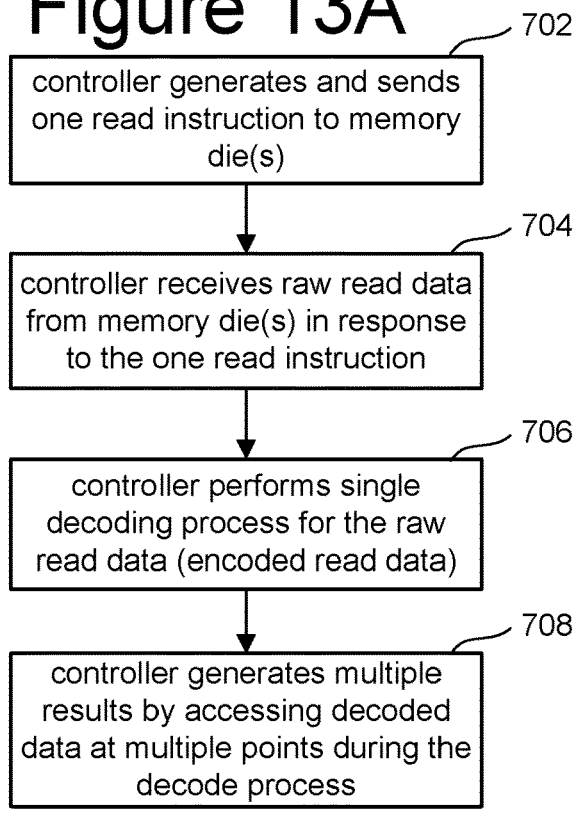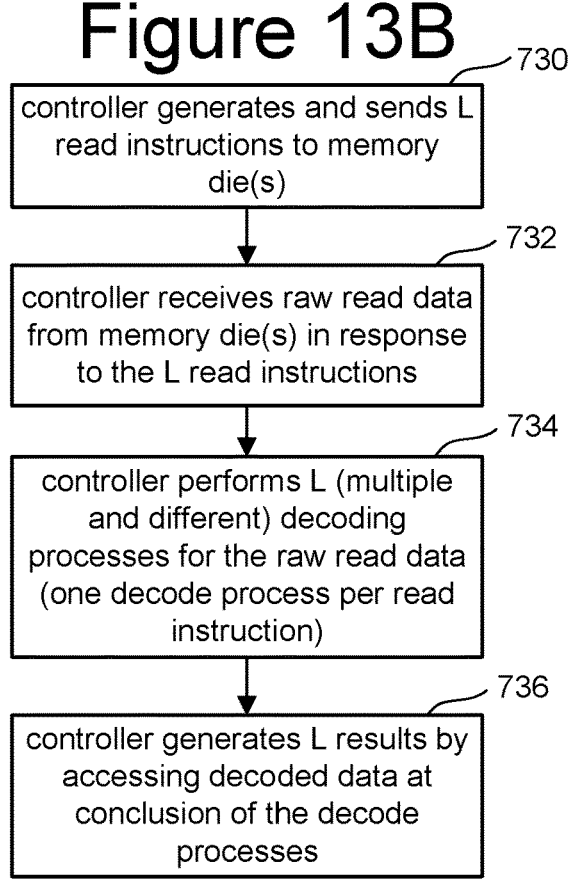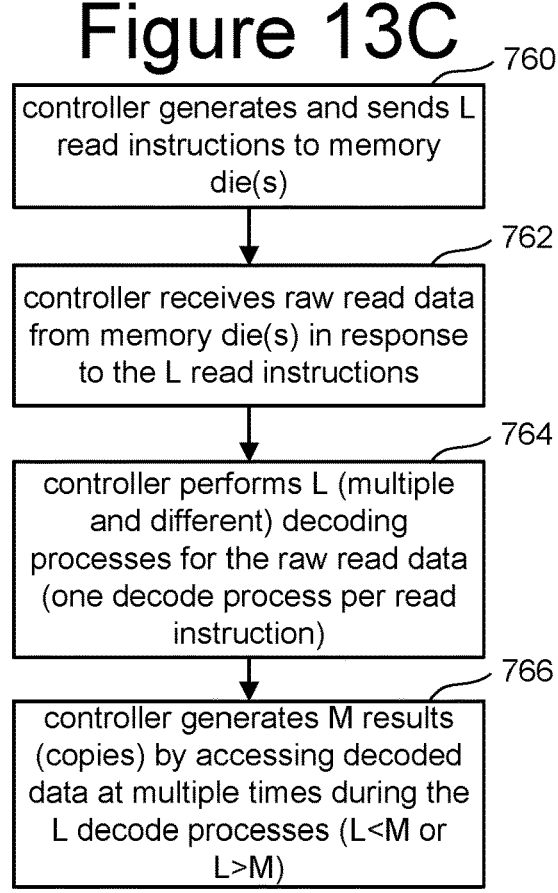

NON-VOLATILE STORAGE SYSTEM WITH MULTI-READ MODE

BACKGROUND

Semiconductor memory is widely used in various electronic devices such as cellular telephones, digital cameras, personal digital assistants, medical electronics, mobile computing devices, non-mobile computing devices and data servers. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), and others.

When a memory system is deployed in or connected to an electronic device (the host), the memory system can be used to store data and read data. It is important that once data is stored in a memory system, the data can be read back. Therefore, some memory systems will encode the data prior to storing using error correction codes. Subsequently, when reading the data, the memory system will decode the data and (hopefully) correct any errors found. If the number of errors is within the capabilities of the error correction codes, then the memory system will decode the data and return the data error free to the host. If the number of errors is beyond the capabilities of the error correction codes, then the memory system will report an error message to the host without returning any data to the host.

BRIEF DESCRIPTION OF THE DRAWINGS

Like-numbered elements refer to common components in the different figures.

FIG. 6 is a logical block diagram of one embodiment of a Controller interfacing with a host.

FIG. 7 is a table describing one embodiment of the contents of a submission queue entry.

FIG. 8 is a table describing one embodiment of the contents of a command in a submission queue entry.

FIG. 9 is a table describing one embodiment of the contents of a completion queue entry.

FIG. 10 is a flow chart describing on embodiment of a process for performing a command.

FIG. 12 is a flow chart describing on embodiment of a process for reading data.

FIGS. 13A-C are flow charts describing different embodiments of reading data and generating multiple results.

DETAILED DESCRIPTION

There are some applications that do not require 100% error free data. For example, with photographs, video streaming and audio streaming, a small number of errors may be tolerated and even preferred as compared to completely failing to provide the data. Therefore, it is proposed to provide a non-volatile memory system that can be configured to return data that is "error reduced" rather than "error free" for applications that do not necessarily need error free data. For example, the host (or other entity external to the memory system) sends one or more commands to the memory system to read data (the "target read data"). In response to the commands, the memory system performs one or more read operations and returns multiple copies of the target read data to the host (or other entity external to the memory system), with the multiple copies returned over time progressively getting better (e.g., later in time returned results have lower number of errors than earlier returned results). Thus, the host receives multiple copies of the target read data, with different numbers of errors between the copies of target read data (or different reliability scores between the target read data). The host can wait until the data is good enough, and then abort the remainder of the read process or ignore subsequently provided copies of the target read data (subsequent results). In this manner, the host only needs to wait until the quality of the data is good enough and does not need to wait unnecessarily for better data than it needs. In some instances, the host will be better able to correct errors in the provided data using an error correction process with multiple copies of the data having different error rates.

One embodiment of a non-volatile storage apparatus that implements the proposed technology comprises non-volatile memory and one or more control circuits connected to the non-volatile memory. The one or more control circuits are configured to program to and read from the non-volatile memory. The one or more control circuits are configured to report multiple copies of data read in response to receiving one or more read commands, with each reported copy of the data read having a different number of errors.

Figure 1:
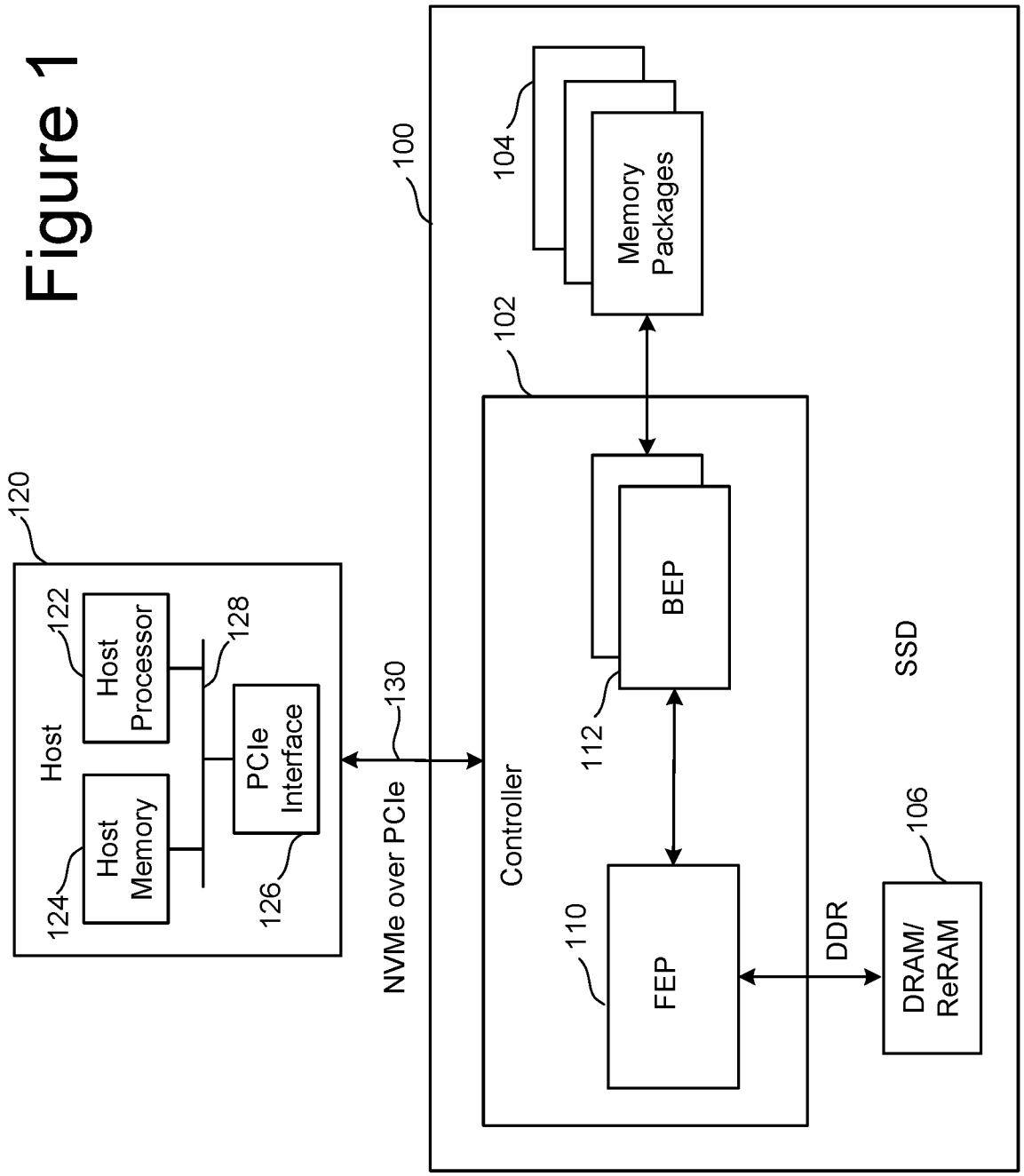
FIG. 1 is a block diagram of one embodiment of a memory system connected to a host.

FIG. 1 is a block diagram of one embodiment of a memory system 100 connected to a host 120. Memory system 100 can implement the technology proposed herein. Many different types of memory systems can be used with the technology proposed herein. One example memory system is a solid state drive ("SSD"); however, other types of memory systems can also be used. Memory system 100 comprises a Controller 102, non-volatile memory 104 for storing data, and local memory (e.g. DRAM/ReRAM) 106. Controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 14 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
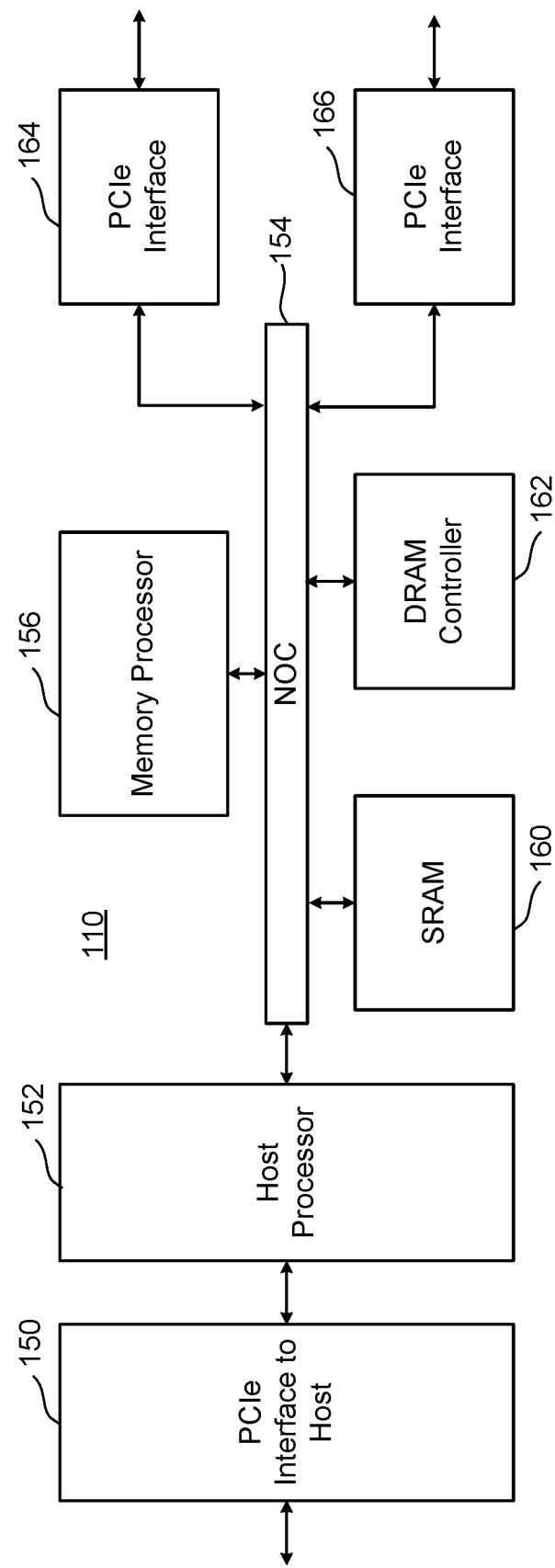
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 2, the SSD controller will include two BEP circuits 112; therefore there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 3:
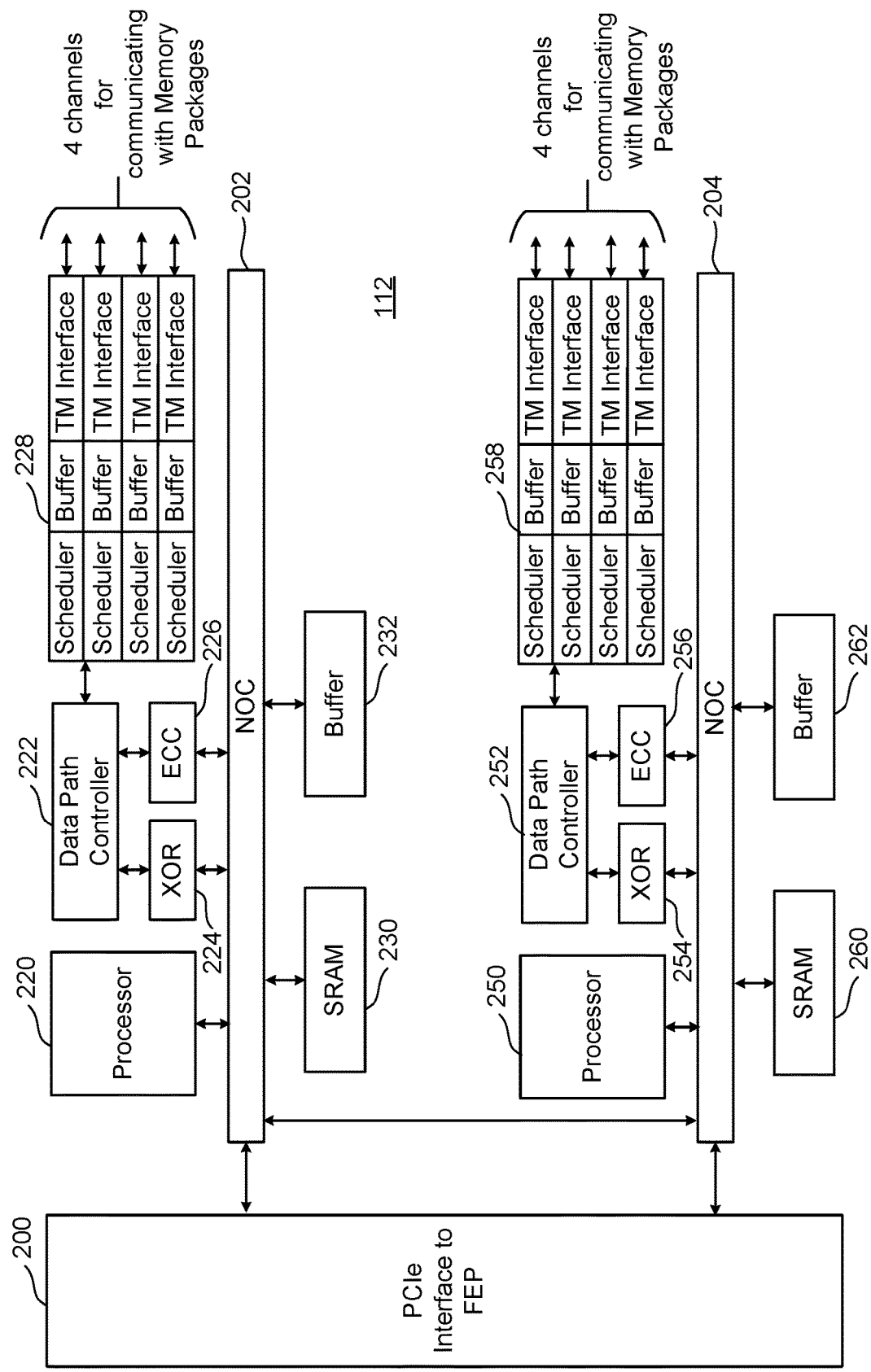
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
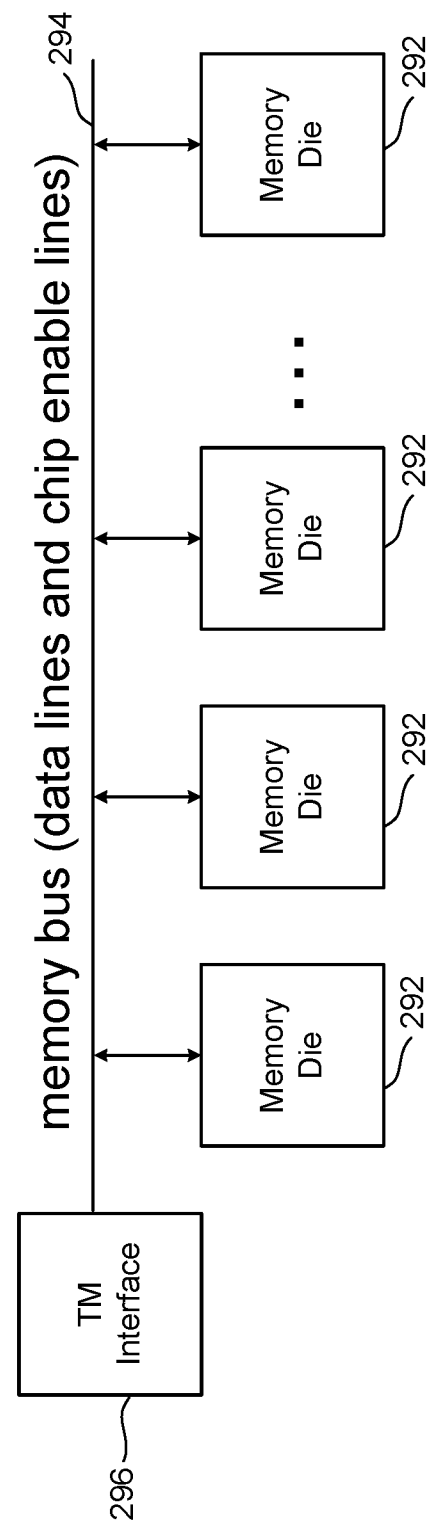
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g. FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
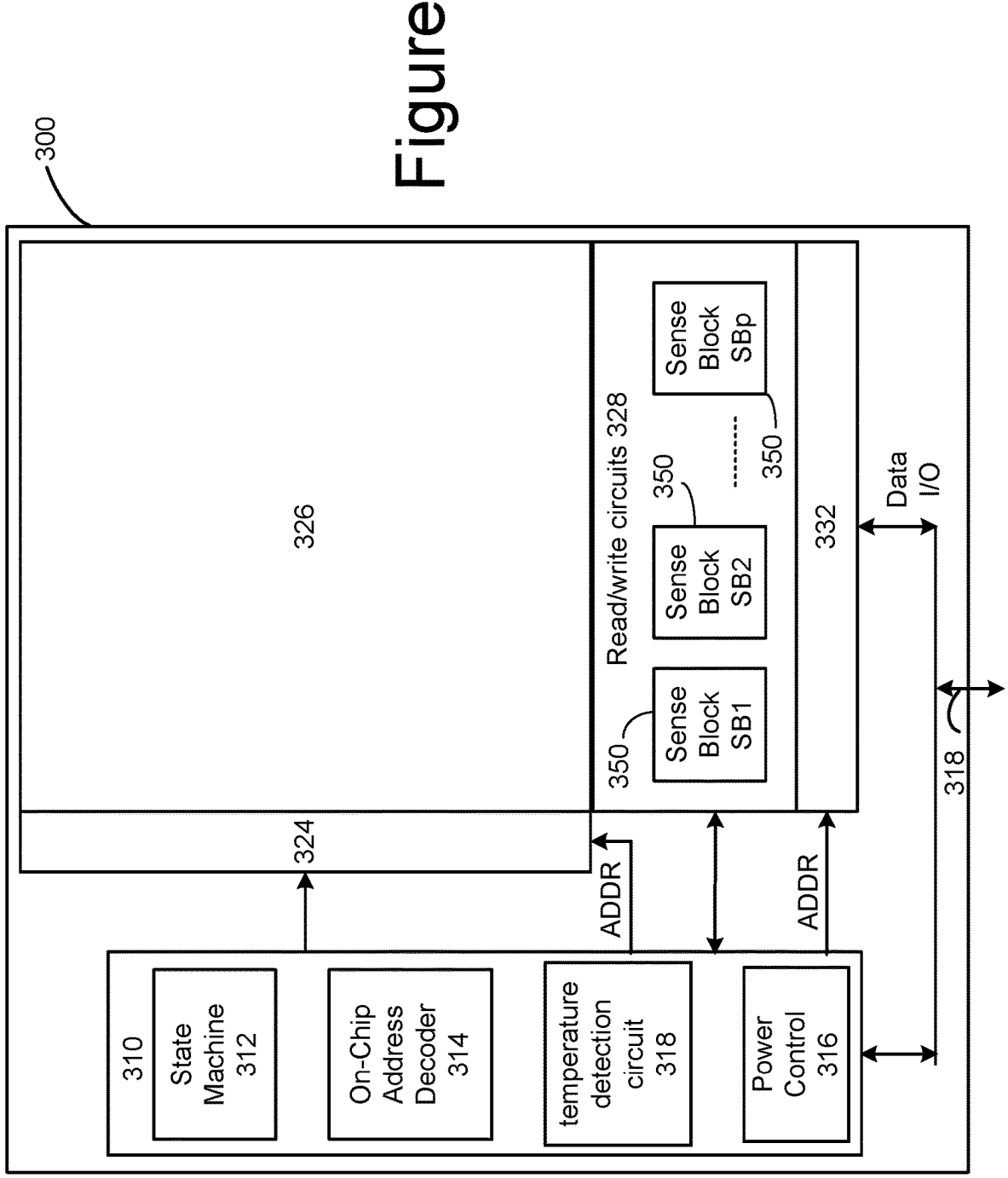
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 126 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the Controller and the memory die 300 via lines 318. In one embodiment, memory die 108 includes a set of input and/or output (I/O) pins that connect to lines 118.

Control circuitry 310 cooperates with the read/write circuits 328 to perform memory operations (e.g., write, read, and others) on memory structure 326, and includes a state machine 312, an on-chip address decoder 314, a power control circuit 316 and a temperature detection circuit 318.

State machine 312 provides die-level control of memory operations. In one embodiment, state machine 312 is programmable by software. In other embodiments, state machine 312 does not use software and is completely implemented in hardware (e.g., electrical circuits). In another embodiment, state machine 312 is replaced by a micro-controller. In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

For purposes of this document, the phrase "one or more control circuits" refers to a controller, a state machine, a micro-controller and/or control circuitry 310, or other analogous circuits that are used to control non-volatile memory.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

As discussed above, in one embodiment the interface 130 between the memory system 100 and the host 120 is NVMe over PCIe. NVMe is an interface that allows host software to communicate with a non-volatile memory system. This interface is optimized for Enterprise and Client solid state drives, typically attached as a register level interface to the PCIe interface. The register interface and command set are specified apart from any usage model for the non-volatile memory system, but rather only specifies the communication interface to the non-volatile memory system. Thus, this specification does not specify whether the non-volatile memory system is used as a solid state drive, a main memory, a cache memory, a backup memory, a redundant memory, etc. (any of which can be implemented for system 100).

The NVMe interface provides submission and completion queues that are used for the host to submit commands and the memory system to provide an indication of the outcome from executing the submitted commands. An NVMe command (e.g. Read or Write) is initiated at the host and to a particular submission queue that lives in host memory. Once the command is inserted into a queue, the host writes to a per-queue doorbell register on the controller. This doorbell write wakes up the controller, which then probes the queue for the new request(s). The controller reads the queue entry, executes the command, appends a completion into a completion queue and notifies the host of this via an interrupt. The host wakes up, pops that completion off the queue and returns results to the user.

There are two main types of queues that are used: Administrative Queues and I/O Queues. Administrative Queues are used for configuring and managing various aspects of the controller. There is only one pair of Administrative queues per controller. I/O Queues are used to move NVMe protocol specific commands (e.g. Read, Write). There can be up to 64K I/O queues per controller. In some embodiments, there is one pair of I/O queues per processor core; however, processor cores can have more than on pair of I/O queues and/or the number of I/O queues can be unrelated to the number of processor cores. Each queue pair includes a submission queue and a completion queue. In some embodiments, all of the queues reside in host memory.

A submission queue (SQ) is a circular buffer with a fixed slot size that the host software uses to submit commands for execution by the controller. Each submission queue entry is a command. Commands are 64 bytes in size.

A completion queue (CQ) is a circular buffer with a fixed slot size used to post status for completed commands. A completed command is uniquely identified by a combination of the associated SQ identifier and command identifier that is assigned by host software. Multiple submission queues may be associated with a single completion queue. This feature may be used where a single worker thread processes all command completions via one completion queue even when those commands originated from multiple submission queues. A Phase Tag (P) bit in each completion queue entry indicates whether the entry has been newly posted. This enables host software to determine whether the new entry was posted as part of the previous or current round of completion notifications. After reading and processing a completion queue entry, the controller inverts the Phase Tag bit for that entry.

Each of submission queues and completion queues have both head pointers and tail pointers. The tail pointer points to the next available entry to add an entry into the queue. After the producer adds an entry to a queue, the producer increments the tail pointer (taking into consideration that once it gets to the end of the queue, it will wrap back to zero—they are all circular queues.) The queue is considered empty if the head and tail pointers are equal. The consumer uses the head pointer to determine where to start reading from the queue, after examining the tail pointer and determining that the queue is non-empty. The consumer will increment the head pointer after reading the each entry.

The submission queue's tail pointer is managed by the host. After one or more entries have been pushed into the queue, the tail pointer (that was incremented) is written to the controller via a submission queue doorbell register residing on the controller. The controller maintains the head pointer and begins to read the queue once notified of the tail pointer update. It can continue to read the queue until empty. As it consumes entries, the head pointer is updated, and sent back to the host via completion queue entries.

The completion queue's tail is managed by the controller, but unlike the host, the controller only maintains a private copy of the tail pointer. The only indication that there is a new completion queue entry is the Phase Tag bit in the completion queue entry that can be polled. Once the host determines an entry is available, it will read that entry and update the head pointer. The controller is notified of head pointer updates by host writes to the completion queue doorbell register.

Note that all work done by an NVMe controller is either pulled into or pushed out of that controller by the controller itself. The host merely places work into host memory and rings the doorbell ("you've got a submission entry to handle"). Later it collects results from the completion queue, again ringing the doorbell ("I'm done with these completion entries"). So the controller is free to work in parallel with the host. There is no requirement for ordering of completions— the controller can order it's work anyway it chooses.

FIG. 6 is a logical block diagram of one embodiment of components in Controller 102 and the components residing in Host Memory 124 that are used to implement one embodiment of NVMe over PCIe interface 130 between memory system 100 and host 120. In one embodiment, the host's physical memory (Host Memory 124) includes driver 402, data structure 404 for administrative commands, data structure 406 for Core 0, data structure 408 for Core 1, and Host Memory Buffer 410. Driver 402 is software on host 120 that interfaces with memory system 100. Data structure 404 includes the submission queue (S) and the completion queue (C) for administrative commands, and includes the submission queue head pointer (SQHPA), submission queue tail pointer (SQTPA), and the completion queue head pointer (CQHPA). In one embodiment, the system will maintain separate sets of queues for each Core. FIG. 6 shows sets of queues for two cores (Core 0 and Core 1); however, in other embodiments more or less than two cores can be implemented. The technology described herein is not limited to any number of cores. In other sets of embodiments, there can be a set of submission and completion queues for each thread. In some embodiments, a single core can have multiple sets of submission and completion queues. In the example of FIG. 6, there is a submission queue (S) and a completion queue (C) for Core 0 and a submission queue (S) and a completion queue (C) for Core 1. For example, data structure 406 includes the submission queue (S), completion queue (C), submission queue head pointer (SQHP0), submission queue tail pointer (SQTP0) and completion queue head pointer (CQHP0), all for Core 0. Data structure 408 includes the submission queue (S), completion queue (C), submission queue head pointer (SQHP1), submission queue tail pointer (SQTP1) and completion queue head pointer (CQHP1), all for Core 1. Host Memory Buffer 410 is a portion of Host Memory 124 that can be allocated (upon request from Controller 102) to be used by Controller 102.

FIG. 6 shows Controller 102 including five software modules, each representing processes running on Controller 102: Flash Translation Layer 430, I/O Automation Engine 432, Memory Interface Engine 434, Host Interface Engine 436 (direct PCIe access), and Multi-Read Engine 438. Flash Translation Layer 430 translates between logical addresses used by Host 120 and physical addresses used by the various memory die within memory system 100. I/O Automation 432 accesses the various commands in the submission queue, executes those commands, and returns results in the completion queues. Memory Interface Engine 434 manages the interface between Controller 102 and the various memory packages 104. For example, Memory Interface Engine 434 may be implemented on processors 220 and 250 (see FIG. 3). Host Interface Engine 436 implements the interface between Controller 102 and Host 120. For example, Host Interface Engine 434 can be running on Host Processor 152 (see FIG. 2). Multi-Read Engine 438 is used to read data and provide multiple results having different numbers of errors (or different reliability scores). For example, Multi-Read Engine 438 can perform the processes of FIGS. 11, 12, and/or 15 (discussed below). In one embodiment, Flash Translation Layer 430, I/O Automation Engine 432 and Multi-Read Engine 438 are performed/ implemented by memory processor 156 (see FIG. 2). In other embodiments, other architectures for Controller 102 can be used so that other processors or groups of processors can be used to implement the software modules 430-438.

FIG. 6 also shows Controller 102 having four sets of data: Command Log 440, Active Command Buffer 442, Doorbell Registers 444 and Queue Pointers 446. In one embodiment, sets of data 440, 442, 444 and 446 are stored in the local memory for Controller 102 (e.g. DRAM 106 of FIG. 1). Command Log 440 stores copies of a sequence of commands and associated timing information for those commands so that those commands can be replayed or re-executed at a later time. Active Command Buffer 442 stores the commands that have been accessed from the various submission queues and that are in line to be executed by Controller 102. Doorbell registers 444 are a set of registers that are operated as doorbells. As discussed above, when host 120 adds an entry to a submission queue or consumes an entry on a completion queue it will ring an appropriate doorbell by writing the updated pointer to that doorbell. Thus, FIG. 6 shows Doorbell Registers 444 including the Submission Queue Tail Doorbell for the administrative queues (SQTDBA), the Completion Queue Head Doorbell for the administration queues (CQHDBA), the Submission Queue Tail Doorbell for Core 0 (SQTDB0), the Completion Queue Head Doorbell for Core 0 (CQHDB0), Submission Queue Tail Doorbell for Core 1 (SQTDB1), and the Completion Queue Head Doorbell for Core 1 (CQHDB1).

Queue Pointers 446 include the head and tail pointers for the various sets of queues discussed above. In one embodiment, Controller 102 maintains a copy of the head and tail pointer for each queue. In the example of FIG. 6 there are six queues; therefore, Controller 102 stores six head pointers and six tail pointers. For example, FIG. 6 shows Queue Pointers 446 including the Submission Queue Head Pointer for the administrative queues (SQHPA), Submission Queue Tail Pointer for the administrative queues (SQTPA), the Completion Queue Head Pointer for the administration queues (CQHPA), the Completion Queue Tail Pointer for the administrative queues (CQTPA), the Submission Queue Head Pointer for Core 0 (SQHP0), the Submission Queue Tail Pointer for Core 0 (SQTP0), the Completion Queue Head Pointer for Core 0 (CQHP0), the Completion Queue Tail Pointer for Core 0 (CQTP0), the Submission Queue Head Pointer for Core 1 (SQHP1), the Submission Queue Tail Pointer for Core 1 (SQTP1), the Completion Queue Head Pointer for Core 1 (CQHP1), and the Completion Queue Tail Pointer for Core 1 (CQTP1). In other embodiments, the submission queues and completion queues can be replaced by other types of data structures.

FIG. 7 is a table describing the contents of a submission queue entry. In one embodiment, each submission queue entry is 64 bytes in size. The first four bytes are referred to as the command Dword 0, which includes the op code for the command and control bits (which we discussed in more detail with respect to FIG. 8). Additionally, the submission queue entry includes a name space identifier (NSID), a metadata pointer (MPTR), a data pointer (DPTR), and command Dwords 15-10 (CDW 15-10). Name space identifier (NSID) specifies the name space that the command applies to. The metadata pointer (MPTR) contains the address of a buffer that contains metadata (if any). The data pointer (DPTR) specifies data used in the command. Examples of a data pointer include a physical region page (PRP) entry, which is a pointer to a physical memory page on the host. PRP's are used as a mechanism for data transfer between the controller and host memory. Another example of a data pointer can include pointing to a Scatter Gather List (SGL), which is the data structure in host memory address space used to describe a data buffer. Other types of buffers can also be used. The command Dwords 15-10 (CDW 15-10) include six double words of command specific information.

FIG. 8 is a table describing the contents of command Dword 0 (see FIG. 7). In one example embodiment, command Dword 0 includes an eight bit op code (OPC), which is the op code used for the command to be executed. Command Dword 0 also includes a fused operation (FUSE) field. In a fused operation, a complex command is created by fusing together two simpler commands. Two bits (15:14) are used to specify whether PRPs or SGLs are used for any data transfer associated with the commands. Bits 16 to 31 of command Dword 0 store a command identifier (CID), which specifies a unique identifier for the command when combined with the submission queue identifier.

FIG. 9 is a table describing one embodiment of the contents of the completion queue entry. In one example, an entry in the completion queue is at least 16 bytes in size (e.g. four double words). FIG. 9 provides a layout of one example of the completion entry data structure. The contents of bytes 0-3 include a fifteen bit Status Field, a Phase Tag P and a command identifier (CID). The status field indicates the status of the command being completed. The Phase Tag P identifies whether the completion queue entry is new. The Phase Tag values for all completion queue entries shall be initialized at 0 by host software. When the controller places an entry in the completion queue, the controller inverts the Phase Tag P to enable the host software to discriminate a new entry. In one embodiment, the Phase Tag P is a single bit. The command identifier (CID) includes 16 bits that indicates the identifier of the command that is being completed. This identifier is assigned by the host software when the command is submitted to the submission queue. The combination of the submission queue identifier and command identifier uniquely identifies the command that is being completed.

Bytes 04-07 of the completion queue entry include a SQ Identifier, which includes 16 bits used to indicate the submission queue to which the associated command was issued. This field is used by host software when more than one submission queue shares a single completion queue to uniquely determine the command completion in combination with the command identifier (CID). The SQ Head Pointer includes 16 bits used to indicate the current submission queue head pointer for the submission queue indicated in the SQ Identifier field. This is used to indicate to the host the submissions queue entries that have been consumed and may be reused for new entries. Bytes 08-11 are reserved. Bytes 12-15 are command specific. If a command uses this double word, then the definition of this double word is contained within the associated command definition. If the command does not use this double word, then the field is reserved. In one embodiment, the tables of FIGS. 7, 8 and 9 represent formats used for the NVMe specification.

FIG. 10 is a flowchart describing one embodiment of a process of executing a sequence of commands. In step 540 of FIG. 10, Host 120 writes a command to a Submission Queue. For example, host 120 can add a command to the Submission Queue (S) for Core 0. In step 542, host 120 adjusts the Tail Pointer for the Submission Queue to reflect the command added to the Submission Queue. For example, host 120 will update SQTP0 (see FIG. 6). In step 544, host 120 rings the doorbell for the Submission Queue by writing the updated Submission Queue Tail Pointer (SQTP0) to the Submission Queue Tail Doorbell (SQTDB) on Controller 102. In response to the host writing to the Submission Queue Tail Doorbell (SQTDB), controller 102 performs arbitration if there is more than one Submission Queue with a new entry. There are multiple types of arbitration that can be performed. Three suitable examples include round robin arbitration, weighted round robin arbitration, and urgent priority class arbitration; however, other types of arbitration can also be performed. In the general sense, arbitration is choosing which queue to obtain the next command from. In response to the host writing to the Submission Queue Tail Doorbell and in response to the arbitration, Controller 102 fetches the next command based on the value of the Submission Queue Head Pointer (SQHP0) and the arbitration performed in step 546. In step 550, in response to fetching the command, controller 102 updates the Submission Head Pointer (SQHP0) on controller 102. The Submission Head Pointer (SQHP0) will be sent back to the host via the Completion Queue, as discussed below. In this manner, both controller 102 and Host 120 maintain copies of the Submission Queue Head Pointer (SQHP0) and the Submission Queue Tail Pointer (SQTP0). In step 552, controller 102 stores the fetched command in a local data structure for execution, such as Active Command Buffer 442. In step 554, Controller 102 executes the next command in Active Command Buffer 442. Note in some embodiments, steps 540-552 are performed in a loop that is separate form and concurrent with step 554.

In step 558, after executing the command, controller 102 writes the results to the appropriate completion queue based on the Completion Queue Tail Pointer which only resides on the controller 102. In this example, controller 102 uses Completion Queue Tail Pointer CQTP0 to write in the completion queue (C) for Core 0. The Completion Queue entry added in step 558 includes the updated Submission Queue Head Pointer (SQHP0). In step 560, the Completion Queue Tail Pointer (CQTP0) is incremented. In step 562, controller 102 generates an interrupt on Host 120. The interrupt identifies the appropriate Completion Queue that has been updated. In step 564, in response to the interrupt, Host 120 checks the appropriate Completion Queue at the entry pointed to by the Completion Queue Head Pointer. In step 566, host 120 processes the Completion Queue entry. In step 568, Host 120 updates the Completion Queue Head Pointer (CQHP0). In step 570, Host 120 writes the updated Completion Queue Head Pointer (CQHP0) to the Completion Queue Head Doorbell on the controller (CQHDB0). As long as there are commands in the Active Command Buffer 442, steps 554-570 will continuously be performed. Each time the host writes a command to Submission Queue steps 540-552 will be performed.

Memory system 100 uses Error Correction Codes (ECC) to protect data from corruption. Many ECC coding schemes are well known in the art. These conventional error correction codes are especially useful in large scale memories, including flash (and other non-volatile) memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits. As such, some ECC codes are better suited for flash memory devices than others. Generally, ECC codes for flash memory devices tend to have higher code rates (i.e., a lower ratio of code bits to data bits) than the codes used in data communications applications (which may have code rates as low as 1/2). Examples of well-known ECC codes commonly used in connection with flash memory storage include Reed-Solomon codes, other BCH codes, Hamming codes, and the like. Sometimes, the error correction codes used in connection with flash memory storage are "systematic," in that the data portion of the eventual code word is unchanged from the actual data being encoded, with the code or parity bits appended to the data bits to form the complete code word.

The particular read parameters for a given error correction code include the type of code, the size of the block of actual data from which the code word is derived, and the overall length of the code word after encoding. For example, a typical BCH code applied to a sector of 512 bytes (4096 bits) of data can correct up to four error bits, if at least 60 ECC or parity bits are used. Reed-Solomon codes are a subset of BCH codes, and are also commonly used for error correction. For example, a typical Reed-Solomon code can correct up to four errors in a 512 byte sector of data, using about 72 ECC bits. In the flash memory context, error correction coding provides substantial improvement in manufacturing yield, as well as in the reliability of the flash memory over time.

In some embodiments, controller 102 receives host data, also referred to as information bits, that is to be stored in memory cells of non-volatile three dimensional memory structure 126. The informational bits are represented by the matrix $i=[1\ 0]$ (note that two bits are used for example purposes only, and many embodiments have code words longer than two bits). An error correction coding process (such as any of the processes mentioned above or below) is implemented in which parity bits are added to the informational bits to provide data represented by the matrix or code word $v=[1\ 0\ 1\ 0]$, indicating that two parity bits have been appended to the data bits. Other techniques can be used that map input data to output data in more complex manners. For example, low density parity check (LDPC) codes, also referred to as Gallager codes, can be used. More details about LDPC codes can be found in R. G. Gallager, "Low-density parity-check codes," IRE Trans. Inform. Theory, vol. IT-8, pp. 21 28, January 1962; and D. MacKay, Information Theory, Inference and Learning Algorithms, Cambridge University Press 2003, chapter 47. In practice, such LDPC codes are typically applied to multiple pages encoded across a number of storage elements, but they do not need to be applied across multiple pages. The data bits can be mapped to a logical page and stored in non-volatile three dimensional memory structure by programming one or more memory cells to one or more data states, which corresponds to v.

When reading data that has been encoded by error correction codes, the code words v read from the memory cells need to be decoded back to the original data i. In one possible implementation, an iterative probabilistic decoding process is used which implements error correction decoding corresponding to the encoding implemented in the Controller 122. Further details regarding iterative probabilistic decoding can be found in the above-mentioned D. MacKay text. The iterative probabilistic decoding attempts to decode a code word read from the memory by assigning initial probability metrics to each bit in the code word. The probability metrics indicate a reliability of each bit, that is, how likely it is that the bit is not in error. In one approach, the probability metrics are logarithmic likelihood ratios (LLRs) which are obtained from LLR tables. LLR values are measures of the reliability with which the values of various binary bits read from the storage elements are known.

The LLR for a bit is given by $$Q = \log_2 \frac{P(v=0\mid Y)}{P(v=1\mid Y)},$$

where P(v=0|Y) is the probability that a bit is a 0 given the condition that the state read is Y, and P(v=1|Y) is the probability that a bit is a 1 given the condition that the state read is Y. Thus, an LLR>0 indicates a bit is more likely a 0 than a 1, while an LLR<0 indicates a bit is more likely a 1 than a 0, to meet one or more parity checks of the error correction code. Further, a greater magnitude indicates a greater probability or reliability. Thus, a bit with an LLR=63 is more likely to be a 0 than a bit with an LLR=5, and a bit with an LLR=-63 is more likely to be a 1 than a bit with an LLR=-5. LLR=0 indicates the bit is equally likely to be a 0 or a 1.

An LLR value can be provided for each of the bit positions in a code word. Further, the LLR tables can account for the multiple read results so that an LLR of greater magnitude is used when the bit value is consistent in the different code words.

Controller 102 receives the code word Y1 and the LLRs and iterates in successive iterations in which it determines if parity checks of the error encoding process have been satisfied. If all parity checks have been satisfied, the decoding process has converged and the code word has been successfully error corrected. If one or more parity checks have not been satisfied, the decoder will adjust the LLRs of one or more of the bits which are inconsistent with a parity check and then reapply the parity check or next check in the process to determine if it has been satisfied. For example, the magnitude and/or polarity of the LLRs can be adjusted. If the parity check in question is still not satisfied, the LLR can be adjusted again in another iteration. Adjusting the LLRs can result in flipping a bit (e.g., from 0 to 1 or from 1 to 0) in some, but not all, cases. The flipping of bits can be thought of as correcting a bit or correcting an error in the data sensed from the memory cells. In one embodiment, another parity check is applied to the code word, if applicable, once the parity check in question has been satisfied. In others, the process moves to the next parity check, looping back to the failed check at a later time. The process continues in an attempt to satisfy all parity checks. Thus, the decoding process of Y1 is completed to obtain the decoded information including parity bits v and the decoded information bits i.

It is hoped that the above-described decoding process results in all parity checks being satisfied, meaning that the decoding process converged on error free data, which is then returned to the host.

It is possible that the code words sensed from the memory cells have too many errors for the ECC process (performed by ECC engine 226) to correct. In that case, the data is deemed uncorrectable and an error message (without the data) is returned to the host.

There are some applications that do not require 100% error free data. For example, with photographs, video streaming and audio streaming, a small number of errors may be tolerated. Sometimes a small number of errors is preferred as compared to completely failing to provide the data. Therefore, it is proposed to provide a non-volatile memory system that can be configured to return data that is "error reduced" rather than "error free" for applications that do not necessarily need error free data. By allowing the memory to return data with some errors the data will be provided to the host much quicker. Therefore, in response to one or more host read commands, the memory system returns multiple copies of the data over time, with the returned data progressively getting better so that later in time copies of the data have lower number of errors. The host decides when the error rate is good enough and stops the process (or ignores the rest of the results).

Figure 11:
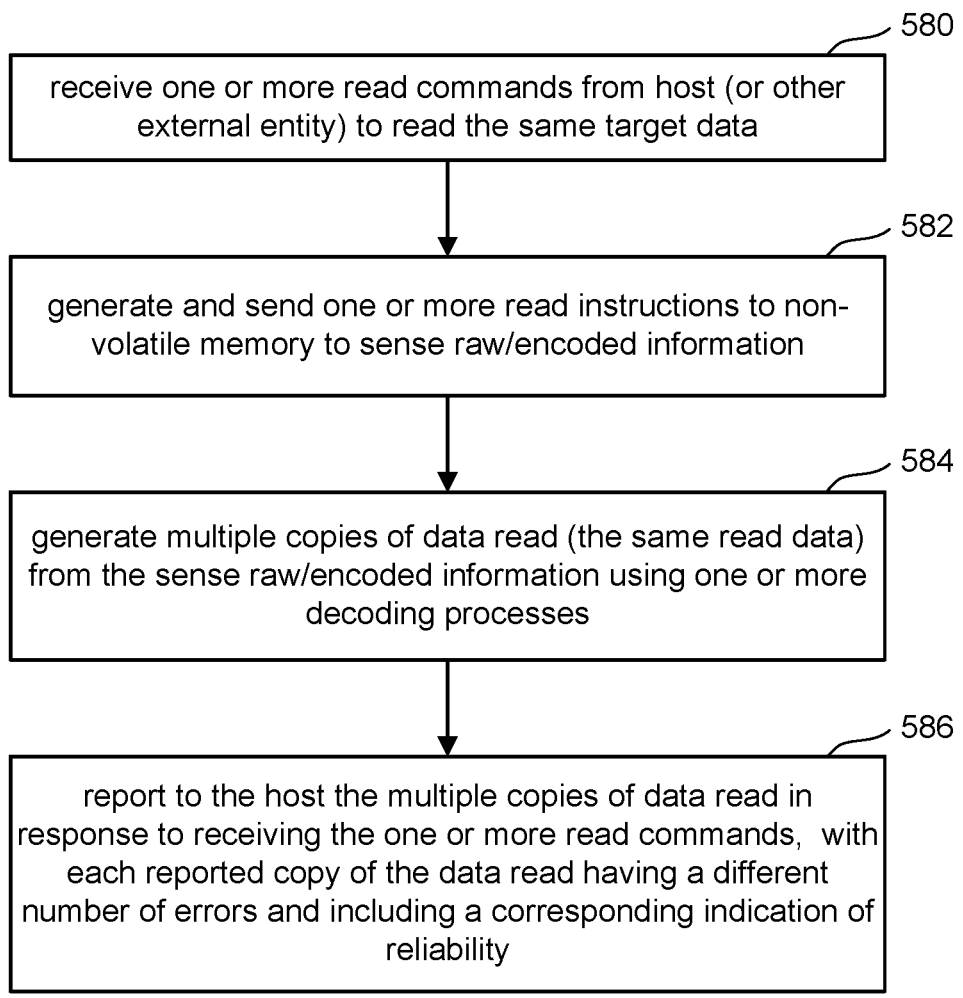
FIG. 11 is a flow chart describing on embodiment of a process for reading data.

FIG. 11 is a flow chart describing one embodiment of a process for reading data that returns multiple error reduced copies of the data over time, with the returned data progressively getting better so that later in time copies of the data have lower number of errors. In one embodiment, the process of FIG. 11 is performed by controller 102. In other embodiments, the process of FIG. 11 can be performed by the state machine, a microcontroller or other processor.

As discussed above, host 120 sends one or more commands to read data from non-volatile memory 104. If the host 120 sends multiple commands to read the data, each of the commands is to read the same data. See FIGS. 7 and 8 regarding one embodiment of the format of the commands. In step 580 of FIG. 11, controller 102 receives one or more read commands from the host (or another external entity) to read the same target data. Step 580 of FIG. 11 corresponds to steps 540-552 of FIG. 10. In step 582, controller 102 generates and sends one or more read instructions to non-volatile memory 104 to sense raw/encoded information stored in the non-volatile memory. In response to those read instructions, the non-volatile memory 104 will perform one or more sensing operations to sense the raw/encoded information. For example, if controller 102 sends one read instruction, then non-volatile memory 104 will perform one or more sense operations to sense one copy of the data. If controller 102 sends X read instructions to non-volatile memory 104, the non-volatile memory 104 will perform one or more sense operations in order to sense X copies of the data. The sensed copies of data will be then sent back to controller 102 (via the TM interface of FIG. 3). The data sensed by non-volatile memory 104 can be read from one memory die or multiple memory die.

In step 584 of FIG. 11, controller 102 generates multiple copies of the data read (multiple copies of the same data) from the sensed raw/encoded information using one or more decoding processes (as discussed above). Steps 582 and 584 of FIG. 11 correspond to step 554 of FIG. 10. In step 586 of FIG. 11, controller 102 reports to host 120 the multiple copies of the data read in response to receiving the one or more read commands from step 580. Each reported copy of the data read has a different number of errors. In one embodiment, when the multiple copies of data (multiple results of the read) are reported back to host 120, each copy is transmitted with an indication of reliability. In one embodiment, each of the different copies of the data reported will have a different indication of reliability. In other embodiments, it is possible that two or more of the copies of data read will have the same indication of reliability. The indication of reliability can include a measure of how many errors are in the data, an estimate or prediction of how many errors are in the data, or an indication of how much of the ECC decoding process was performed. Other indications of reliability can also be used. The controller (or other one or more control circuits) is configured to report the multiple copies of data read such that a later in time reported copy of the data read has a lower number of errors than an earlier reported copy of the data read. Alternatively, the controller (or the one or more control circuits) is configured to report multiple copies of data read such that a later in time reported copy of data read has a greater reliability than an earlier reported copy of the data read.

The host receives multiple copies of the target read data, with different numbers of errors between the copies of target read data (or different reliability scores between the target read data). The host can wait until the data is good enough, and then abort the remainder of the read process or ignore subsequently provided copies of the target read data (subsequent results). In this manner, the host only needs to wait until the quality of data is good enough and does not need to wait unnecessarily for better data than it needs. Additionally, the host will be better able to correct errors in the provided data using an error correction process with multiple copies of the data.

In one embodiment, the process of FIG. 11 is performed by controller 102, as explained above. In other embodiments, the process of FIG. 11 can be performed by the control circuitry 310 of FIG. 5. Therefore, the process of FIG. 11 can be performed by the one or more control circuits discussed above. In one example implementation, memory processor 156 of FIG. 2 performs step 580 and 586 of FIG. 11 and processor 220 performs step 582 and 584 of FIG. 11. In another example implementation, memory processor 156 of FIG. 2 performs all the steps of FIG. 11. In one set of embodiments, the process of FIG. 11 is performed by Multi-Read Engine 438 of FIG. 6.

FIG. 12 is a flowchart describing one embodiment of a process for reading data that returns multiple error reduced copies of data over time, progressively getting better so that later in time copies of the data have lower numbers of errors. The flow chart of FIG. 12 provides more details of one example implementation of the process of FIG. 11. In one embodiment, the process of FIG. 12 is performed by controller 120, such as by memory processor 156 and/or processor 220. In other embodiments, control circuitry 310 can perform the process of FIG. 12. Therefore, any one of the one or more control circuits discussed above can perform the process of FIG. 12. In one example implementation, the process of FIG. 12 is performed by Multi-Read Engine 438 of FIG. 6.

In step 602 of FIG. 12, host 120 sends one read command to memory system 100. That one read command is received at controller 102. With that read command, host 120 supplies parameters such as the maximum copies of the data allowed to be reported. Other parameters can also be included such as maximum error rate, maximum amount of time to perform the read process, or other parameters. Step 602 of FIG. 12 corresponds to steps 540-552 of FIG. 10, as well as step 580 of FIG. 11. In step 604 of FIG. 12, controller 102 reads the target data from one or more memory die. Step 604 can include the controller generating one or more commands to sense raw/encoded data from one or more memory die, as will be explained in more detail below. In response to the controller sending instructions to the memory die, the memory die sense the encoded data and report the encoded data back to controller 102. In step 606, controller 102 generates multiple results. More details of step 606 are provided below. Step 604 and step 606 of FIG. 12 correspond to step 554 of FIG. 10 and step 582/584 of FIG. 11.

In step 608 of FIG. 12, controller 102 accesses the first result that was generated in step 606. In step 610, controller 102 appends an indication of reliability to that first result. In step 612, controller 102 stores the first result in the read buffer included in the instruction from the host (DPTR of FIG. 7). In step 614, controller 102 writes an entry in the completion queue. In step 616, the controller interrupts the host, as discussed above. Step 608-616 correspond to steps 558-562 of FIG. 10 (or a subset of those steps).

In step 618, controller 102 accesses the next result, of the multiple results generated in step 606. Note that the multiple results generated in step 606 can be generated over time. In step 620, controller 102 determines whether to continue the process. That is, controller 102 determines whether to send another copy of the target read data. More details of step 620 are provided below. If the controller 102 determines not to send any more copies of the target read data, then in step 622, controller 102 ends the processing of the read command received in step 602. If controller 102 determines to send more copies of the target read data than in step 624 controller 102 appends an indication of reliability to the current result being worked on (and accessed in the previous iteration of step 618).

In step 626, the controller 102 stores the result in the read buffer. Storing the result in the read buffer in step 626 can include appending the additional result to the end of the buffer or overriding the data that is already in the buffer. In one embodiment, the buffer is in host memory as discussed above. In another embodiment, the buffer storing the results from step 626 can include the Host Memory Buffer which is a portion of host memory that can be allocated (upon request from controller 102) to be used by controller 102. In another embodiment, the results stored in step 626 are saved into the Controller Memory Buffer (CMB), which is a region of general purpose read/write memory on the controller (e.g. DRAM 106) that may be used for a variety of purposes. The controller indicates which purposes the memory may be used by setting support flags in a configuration register. Hosts can then use the CMB to store any of the queues or read buffers discussed herein. In one embodiment the one or more control circuits described herein are configured to report the multiple copies of data read by storing the multiple copies of data in the CMB within the memory system and behind the host interface from a perspective of the memory system. The phrase behind the host interface from a perspective in the memory system refers to being inside memory system 100 such that access by the host can only be made through the PCIe interface 150 of FIG. 2 (or another external interface). Note that steps 608-626 are an example implementation of step 586 of FIG. 11.

FIGS. 13A-C are flowcharts describing different embodiments of reading data and generating multiple results. For example, the process of FIG. 13A-C are different example implementations of steps 604 and 606 of FIG. 12.

In step 702 of FIG. 13A, controller 102 generates and sends one instruction to one or more memory die to read the target read data. In response to that instruction, the one or more memory die perform one or more sensing operations to sense the raw/encoded data. In step 704, controller 102 receives the raw/encoded read data from the one or more memory die in response to the one read instruction that was sent in step 702. In step 706, controller 102 performs a single decoding process for the raw/encoded read data. In step 708, controller 102 generates multiple results (multiple copies of the read data) by accessing the decoded data at multiple points during the decode process. Thus, each of the results will be partially decoded and each of the results will have been subjected to a different amount of decoding such that the error rate should be different (but may not be different). Therefore, the embodiment of FIG. 13A includes the controller generating one read instruction. It is possible that the process of FIG. 13A can be performed in response to the host only sending one read command or in response to the host sending multiple read commands.

While the process of FIG. 13A includes the controller only generating one read instruction to the memory die, the processes of FIGS. 13B and 13C include the controller generating multiple instructions to the one or more memory die.

In step 730 of FIG. 13B, controller 102 generates and sends L read instructions to one or more memory die, where L is an integer greater than 1. In response to the L read instructions, controller 102 receives raw/encoded read data from the one or more memory die in step 732. In step 734, controller 102 performs L (multiple and different) decoding processes for the raw read/encoded read data (e.g., one decode process per read instruction). In step 736, controller 102 generates L results by accessing the decoded data at the conclusion of each of the decode processes of step 734. In one embodiment, each of the read instructions are similar such that the raw/encoded read data return from the memory die for each of the instructions is the same. In another embodiment, the read instructions will be different in order to configure different sensing operations. For example, the sensing operations may vary based on the number of soft bits read, the number of sensing operations performed during the process, the read compare values used, the amount of time used to sense, as well as other parameters. The multiple decoding processes of step 734 can vary based on amount of time used to perform the decoding, the aggressiveness of the decoding, decoding rates, and other parameters that affect the aggressiveness of the decoding process.

FIG. 13C describes another embodiment that includes controller 102 generating multiple read instructions to the one or more memory die. In step 760 of FIG. 13C, controller 102 generates and sends L read instructions to one or more memory die, where L is an integer greater than 1. In response to those read instructions, the one or more memory die perform one or more sensing operations to access the raw/encoded data. In step 762, controller 102 receives a raw/encoded read data from the one or more memory die in response to the L read instructions. In step 764, controller 102 performs L (multiple and different) decoding processes for the raw/encoded read data (one decode process per instruction), as discussed above with respect to FIG. 13B. In step 766, controller 102 generates M results (copies of the data read) by accessing the decoded data at multiple times during the L decode processes, (where either L<M or L>M). In the circumstances where L<M, controller 102 obtained more than one result per decoding process. If L>M, the some decoding processes did not provide suitable read results. In other embodiments, L=M (which is the embodiment of FIG. 13B). Thus, the embodiments of FIGS. 13B and 13C include the one or more processors (or control circuits) being configured to generate multiple copies of the same read data by performing separate decoding operations for the multiple encoded data items such that each read instruction of the multiple read instructions is associated with one of the encoded data items and one of the decoding operations to form a read operation, such that the read operations are configured differently to perform decoding differently.

FIGS. 14A-E are flowcharts describing different embodiments for determining whether or not to provide additional results. That is, each of the processes of FIGS. 14A-E are example implementations of step 620 of FIG. 12.

Figure 14A:
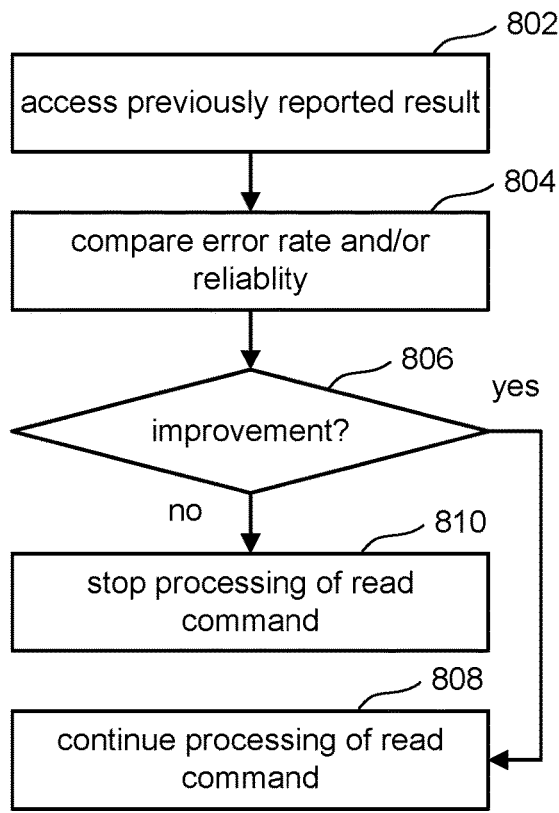
FIGS. 14A-E are flow charts describing different embodiments of determining whether to provide additional results.

The process of FIG. 14A includes the one or more control circuits (e.g. such as controller 102) configured to stop reporting copies of data read when two copies of the data read have numbers of errors (or indications of reliability) within a threshold of each other. In step 802 of FIG. 14A, controller 102 accesses the previously reported result. In step 804, controller 102 compares the error rate and/or the indication of reliability for the previously reported result to the error rate and/or the indication of reliability for the current result being considered for reporting. In step 806, controller 102 (or other of the one or more control circuits) determine whether the current result shows a sufficient improvement in error rate and/or reliability. For example, if the difference in the error rate (or reliability) is within a threshold then there has not been a sufficient improvement. In some embodiments, any improvement is sufficient. In other embodiments, the improvement must be at least 1%, 2%, 5% or some other value. If there has been a sufficient improvement, then in step 808 controller 102 continues processing the read command by reporting out the new result (see process of FIG. 12, step 624). If there has not been sufficient improvement, then in step 810 the controller stop processing the current read command.

Figure 14B:
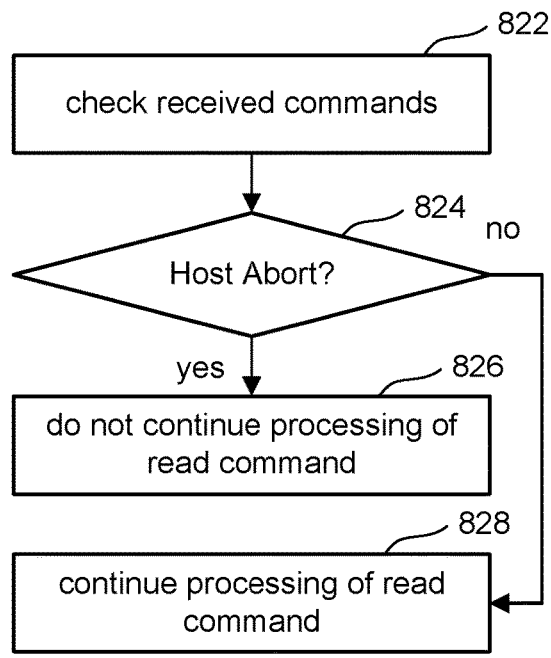
Figure 14C:
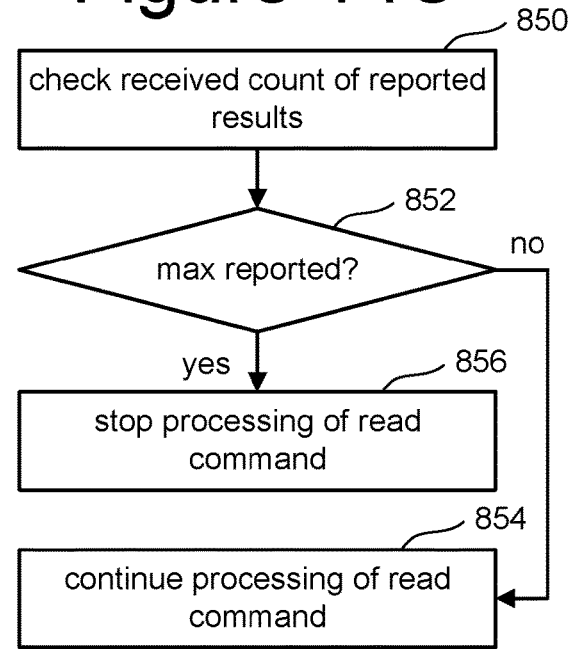

FIGS. 14B and 14C provide flowcharts of different embodiments that include the one or more control circuits (e.g. controller 102) being configured to stop reporting copies of the data read in response to a message from host 120 to stop reporting copies. In step 822 of FIG. 14B, controller 102 checks commands received from the host. For example, controller 102 will check active command buffer 442 (see FIG. 6) to see if there is an abort command from host 120. If there is an abort command, then controller 102 will not continue processing the read command (step A26). If there is no abort command from the host 120, then controller 102 will continue processing the current read command (A28).

When the host sends a read command to the controller 102, that read command can include an indication of the maximum number of results (copies of read data) that can be reported. That maximum number is used by the process of FIG. 14C. In step 850, controller 102 (or other of the one or more control circuits) checks the received count of reported results. That is, in one embodiment, controller 102 will keep track of the number of results reported for each set of target data. If the number of results already reported has reached the maximum number of results allowed by host (from the read command supplied by the host), then in step 856 the controller will stop processing the current read command. Otherwise, controller 102 will continue processing the read command (step 854).

Figure 14D:
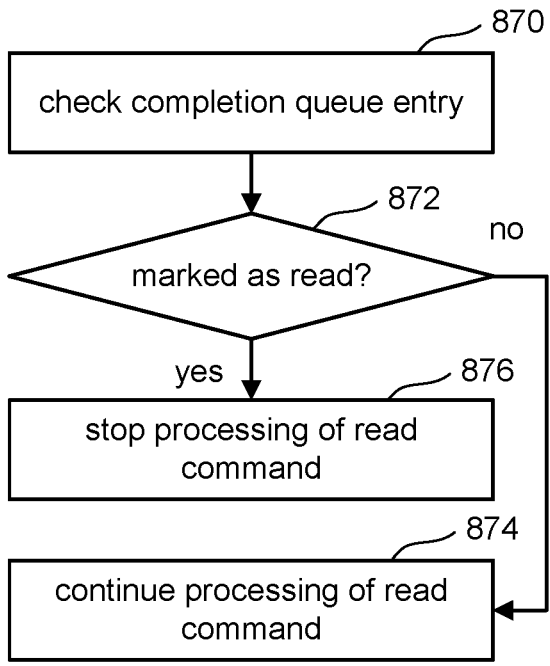
Figure 14E:
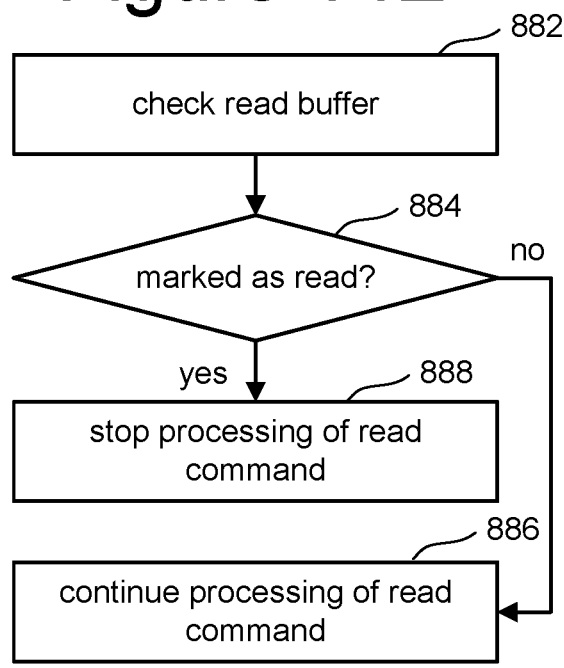

FIGS. 14D and 14E describe embodiments where the one or more control circuits (e.g. controller 102) are configured to stop reporting copies of data read in response to an indication that the host has consumed one of the copies of the data read. In step 870 of FIG. 14D, controller 102 checks the appropriate completion queue entry. In step 872, controller 102 determines whether that completion queue entry has been marked as read. For example, controller 102 determines whether the Phase Tag (P) of FIG. 9 has been inverted. If so, then the controller stops processing the read command and no more copies of the data read are sent to the host (in response to the indication from the host that it has consumed one of the copies of the data read). If the completion queue entry has not been marked as read, then in step 874 the controller 102 continues processing the current read command.

While the process of FIG. 14D includes checking the completion queue entry, the process of 14E includes checking the read buffer to determine whether the host has consumed one of the copies of the data read and reported.

In step 882 of FIG. 14E, controller 102 checks the read buffer. In one embodiment, the read buffer includes a set of entries such that each entry includes a data value and a flag that indicates whether the host has read or otherwise consumed the data. The host will invert or set the flag when the host has read or otherwise consumed the data. Thus step 882 includes checking that flag. In step 884, controller 102 determines whether the particular entry in the read buffer has been marked as read because the flag has been set or otherwise inverted. If so, then controller 102 stops processing the current read command (step 888). If the entry has not been marked as read, then controller 102 continues processing the current read command (step 886).

Figure 15:
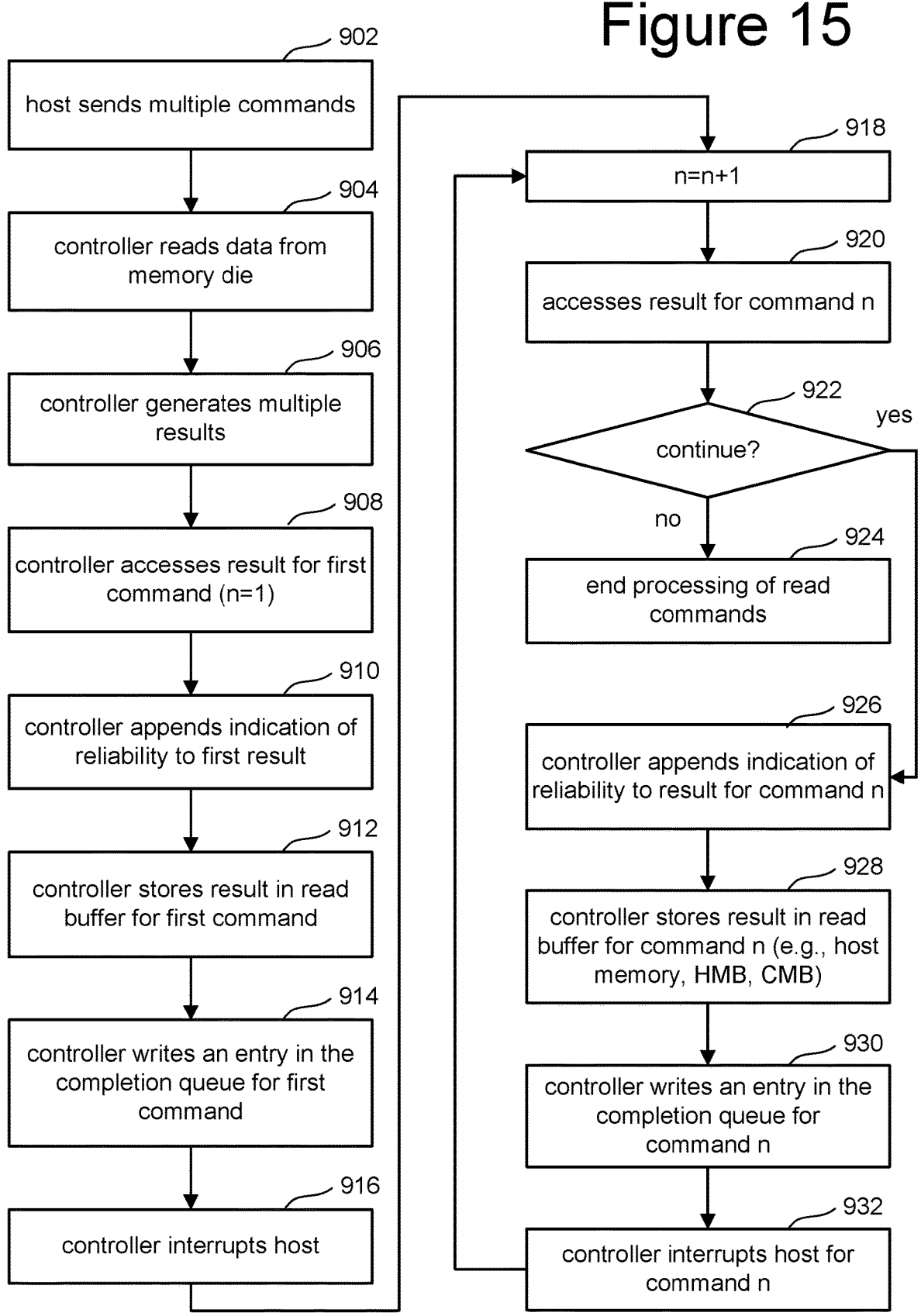
FIG. 15 is a flow chart describing on embodiment of a process for reading data.

FIG. 15 is a flowchart describing another embodiment of a process for reading data that returns multiple error reduced copies of the data over time, progressively getting better so that later in time copies of the data have lower number of errors than earlier in time copies. The process of FIG. 15 provides more details of another example implementation of the process of FIG. 11. In one embodiment, the process of FIG. 15 is performed by controller 102; for example, the process of FIG. 15 can be performed by memory processor 156 and/or processor 220. In another example, control circuitry 310 can perform the process of FIG. 15. In one set of embodiments, the process of FIG. 15 is performed by Multi-Read Engine 438 of FIG. 6. In the embodiment of FIG. 12 the host sends one read command, while in the embodiment of FIG. 15 the host will send multiple read commands.

In step 902 of FIG. 15, host 120 sends multiple read commands to memory system 100. For example, each command is an entry in a submission queue. The multiple read commands sent by host 120 are received by controller 102. All the host commands sent by the host in step 902 have the same command identification (CID), the same logical block address and the same size, but each of the commands has a different buffer (Different DPTR—see FIG. 7). Step 902 corresponds to steps 540-552 of FIG. 10 (one or more iterations of those steps).

In step 904, controller 102 reads data from one or more memory die. In step 906, controller 102 generates multiple results. Steps 904 and 906 correspond to step 554 of FIG. 10. Step 902 also corresponds to step 580 of FIG. 11. Step 904 of FIG. 15 corresponds to step 582 of FIG. 11. Step 906 corresponds to step 584 of FIG. 11. Note that the multiple results generated in step 906 can be generated over time such that step 906 overlaps with steps 908-932 of FIG. 15. That is, the multiple results are not all generated at the same time, but are generated at one or more different times during the process of FIG. 15. Steps 904 and 906 can be performed according to the embodiments of FIG. 13B or FIG. 13C.

In step 908 of FIG. 15, controller 102 accesses a result for the first command (n=1). In step 910, controller 102 appends an indication of reliability to that first result. In step 912, controller 102 stores that result in the read buffer (see DPTR of FIG. 7) for the first command. In step 914, controller 102 writes an entry in the completion queue for the first command. In step 916, controller 102 interrupts the host as per the process of FIG. 10. Steps 908-916 correspond to steps 558-562 of FIG. 10 (or a subset of those steps).

In step 918, the counter is incremented (n=n+1). In step 920, controller 102 accesses the result for command n. In step 922, controller 102 determines whether to continue with the read operation. That is, controller 102 determines whether to continue or not continue to provide additional results based on any of the processes of FIGS. 14A-E. For example, the generating of multiple copies of target read data comprises, for each command to read, determining whether to send another copy of target read data. If it is determined to not report any additional results (not continue) then controller 102 ends processing of the set of read commands from step 902. If it is determined to continue processing and send more results, then in step 926 controller 102 appends an indication of reliability to the result for command n. In step 928, controller 102 stores the result for command n in the read buffer of a command n. (e.g. in host memory, HMB, CMB, or other location.) In step 930, controller 102 writes an entry in the completion queue for command n. In step 932, controller interrupts the host for command n. After step 932, the process loops back to step 918 to perform the reporting of results for the next command. In one embodiment, steps 920-932 correspond to steps 558-562 of FIG. 10 (or a subset of those steps). Note that steps 908-932 of FIG. 15 correspond to step 586 of FIG. 11.

As explained above with respect to FIG. 15, each copy of data read and reported to the host of the multiple copies of data read is reported as being responsive to a different read command of the multiple read commands. In one alternative, multiple results can be reported for a single read command so that although the host issued X read commands more than X results can be reported. For a read command, multiple results can be stored into the same read buffer or one result can be in the indicated read buffer and other results can be in a separate storage area in HMB or CMB. Thus, in one embodiment, controller receives multiple commands comprising receiving M read commands and, in response, controller 102 will generate multiple copies of the target read data comprising, generating and sending of L read instructions to non-volatile memory and receiving raw/encoded data from non-volatile memory response to the L read instructions, with the controller generating multiple copies of the target read data further comprising preparing N copies of the target read data using one or more decoding processes where L>0 and N≤M.

The above discussion describes a non-volatile memory system that returns data which is "error reduced." By allowing the memory to return data with some errors the data will be provided to the host much quicker. Therefore, in response to one or more host read commands, the memory system returns multiple copies of the data over time, progressively getting better so that later in time reported copies of the data have lower number of errors than earlier in time reported copies of the data. The host decides when the error rate is good enough and stops the process (or ignores the rest of the results). In this manner, the host only needs to wait until the quality of the data is good enough and does not need to wait unnecessarily for better data than it needs. Additionally, the host will be better able to correct errors in the provided data using an error correction process with multiple copies of the data.

One embodiment includes a non-volatile memory apparatus comprising non-volatile memory and one or more control circuits in communication with the non-volatile memory. The one or more control circuits are configured to read from the non-volatile memory. The one or more control circuits are configured to report multiple copies of the same data read in response to receiving one or more read commands with each reported copy of the data read having a different number of errors.

One embodiment includes an apparatus comprising a memory interface configured to connect with non-volatile memory, a host interface configured to connect to a host and one or more processors connected to the memory interface and the host interface. The one or more processors configured to receive a read command from a host. The one or more processors are configured to generate and send multiple read instructions to the non-volatile memory via the memory interface in response to the read command. The one or more processors are configured to generate multiple copies of a same read data with corresponding indications of reliability based on raw data received from the non-volatile memory in response to the multiple read instructions. The one or more processors are configured to report the multiple copies of the same read data and corresponding indications of reliability to the host.

One embodiment includes a method of reading data from a non-volatile memory system, comprising: receiving multiple commands to read a same target read data, the multiple commands are received from a single entity; generating multiple copies of the target read data, each copy of the multiple copies of the target read data intentionally has different number of errors than other copies of the multiple copies of the target read data, each copy of the multiple copies of the target read data associated with one of the received multiple commands; and reporting the multiple copies of the target read data back to the single entity.

One embodiment includes a non-volatile memory apparatus comprising a plurality of non-volatile memory cells and means for reading from the memory cells and sequentially reporting multiple copies of data read over time in response to receiving one or more read commands with each reported copy of the data read progressively having a smaller number of errors. For example, the non-volatile memory apparatus may be a solid state drive that includes a controller connected to a memory die. The memory die includes the plurality of non-volatile memory cells, as well as various control circuitry. The controller includes the means for reading from the memory cells and sequentially reporting multiple copies of data read.

In one embodiment, the means for reading from the memory cells and sequentially reporting multiple copies of data read comprises software running on a processor, such as Multi-Read Engine 438 performing the processes of FIGS. 11, 12, and/or 15. Other software or hardware that are part of a memory controller can also be used.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory apparatus, comprising:
non-volatile memory; and
one or more control circuits in communication with the non-volatile memory and an entity external to the non-volatile memory apparatus, the one or more control circuits are configured to receive a read command from the entity external to the non-volatile memory apparatus, the one or more control circuits are configured to read encoded data from the non-volatile memory in response to the read command, the one or more control circuits are configured to perform decoding of the encoded data to generate multiple partially decoded copies of the encoded data, the one or more control circuits are configured to report the multiple partially decoded copies of the encoded data to the entity external to the non-volatile memory apparatus in response to the read command from the entity, each of the reported multiple partially decoded copies of the encoded data have one or more errors and each of the reported multiple partially decoded copies of the encoded data have a different number of errors due to a different amount of decoding.

2. The non-volatile memory apparatus of claim 1, wherein:
the one or more control circuits are configured to report the multiple partially decoded copies of the encoded data such that a later in time reported partially decoded copy of the encoded data has a lower number of errors than an earlier reported partially decoded copy of the encoded data.

3. The non-volatile memory apparatus of claim 1, wherein:
the one or more control circuits are configured to report the multiple partially decoded copies of the encoded data such that a later in time reported partially decoded copy of the encoded data has a greater reliability than an earlier reported partially decoded copy of the encoded data.

4. The non-volatile memory apparatus of claim 1, wherein:
the one or more control circuits are configured to generate the multiple partially decoded copies of the encoded data in response to receiving the read command using a single decoding process that removes the reported multiple partially decoded copies of the encoded data from the single decoding process at different points in the single decoding process.

5. The non-volatile memory apparatus of claim 1, wherein:
the one or more control circuits are configured to generate the multiple partially decoded copies of the encoded data in response to receiving the read command using multiple different decoding processes.

6. The non-volatile memory apparatus of claim 1, wherein:
the one or more control circuits include a host interface configured to connect to a host and a memory interface configured to connect with the non-volatile memory, the host is the entity external to the non-volatile memory apparatus, the read command is received from the host via the host interface; and the one or more control circuits are configured to report the multiple partially decoded copies of the encoded data by storing the multiple partially decoded copies of the encoded data in a buffer behind the host interface from a perspective of the non-volatile memory apparatus.

7. The non-volatile memory apparatus of claim 1, wherein:
the one or more control circuits are configured to generate L read instructions to read the encoded data from the non-volatile memory in response to the read command and generate M partially decoded copies of the encoded data, where L<M.

8. The non-volatile memory apparatus of claim 1, wherein:
the one or more control circuits are configured to stop reporting partially decoded copies of the encoded data when two partially decoded copies of the encoded data have numbers of errors within a threshold of each other.

9. The non-volatile memory apparatus of claim 1, wherein:
the one or more control circuits are configured to stop reporting partially decoded copies of the encoded data in response to a message from the entity external to the non-volatile memory apparatus to stop reporting copies.

10. The non-volatile memory apparatus of claim 1, wherein:
the one or more control circuits are configured to report the multiple partially decoded copies of the encoded data to a host, the host is the entity external to the non-volatile memory apparatus, the one or more control circuits are configured to stop reporting partially decoded copies of the encoded data in response to an indication that the host has consumed one of the partially decoded copies of the encoded data.

11. The non-volatile memory apparatus of claim 1, wherein:
the one or more control circuits are configured to report to the entity external to the non-volatile memory apparatus an indication of reliability for each of the reported multiple partially decoded copies of the encoded data.

12. An apparatus, comprising:
a memory interface configured to connect with non-volatile memory;
a host interface configured to connect to a host that is separate from the apparatus; and
one or more processors connected to the memory interface and the host interface, the one or more processors are configured to receive a read command from the host via the host interface, the one or more processors are configured to generate and send multiple read instructions to the non-volatile memory via the memory interface in response to the read command, the one or more processors are configured to receive encoded data from the non-volatile memory via the memory interface in response to the read instruction, the one or more processors are configured to generate multiple partially decoded copies of the encoded data with corresponding indications of reliability, the one or more processors are configured to report the multiple partially decoded copies of the encoded data and the corresponding indications of reliability to the host, the multiple partially decoded copies of the encoded data have different amounts of errors due to different amounts of decoding.

13. The apparatus of claim 12, wherein:
the one or more processors configured to receive multiple encoded data items in response to the multiple read instructions; and
the one or more processors configured to generate the multiple partially decoded copies of the encoded data by performing separate decoding operations for the multiple encoded data items such that each read instruction of the multiple read instructions is associated with one of the encoded data items and one of the decoding operations to form a read operation, the read operations are configured differently to perform decoding differently.

14. The apparatus of claim 12, wherein:
the one or more processors, the memory interface and the host interface comprise a controller of a solid state drive;
the host interface implements a NVMe interface; and
the one or more processors are configured to report the multiple partially decoded copies of the encoded data by posting to one completion queue entry associated with all of the multiple partially decoded copies of the encoded data and storing each of the multiple partially decoded copies of the encoded data.

15. A method of reading data from a non-volatile memory system, comprising:
receiving one or more commands to read target data, the one or more commands are received from a host external to the non-volatile memory system;
generating multiple partially decoded copies of the target data, each partially decoded copy of the multiple partially decoded copies of the target data intentionally has a different non-zero number of errors than other partially decoded copies of the multiple partially decoded copies of the target data; and
reporting the multiple partially decoded copies of the target data to the host.

16. The method of claim 15, wherein:
the receiving the one or more commands comprises receiving M commands to read the target data from the host; and
the generating multiple partially decoded copies of the target data comprises generating and sending L read instructions to non-volatile memory and receiving encoded data from the non-volatile memory in response to the read instructions, the generating multiple partially decoded copies of the target data further comprises preparing N partially decoded copies of the target data using one or more decoding processes, where L>0 and N≤M.

17. A non-volatile memory apparatus, comprising:
a plurality of non-volatile memory cells; and
means for receiving a read request from a host, reading encoded data from the memory cells, generating multiple partially decoded copies of the encoded data using a single decoding process for the encoded data and sequentially reporting the multiple partially decoded copies of the encoded data to the host with each partially decoded version of the encoded data reported progressively having a smaller number of errors due to different amounts of decoding.

* * * * *